(12) United States Patent
Schick et al.

(10) Patent No.: US 9,939,984 B2
(45) Date of Patent: *Apr. 10, 2018

(54) METHODS AND SYSTEMS FOR AN INTERMEDIATE GRAPHICAL DESKTOP SHARING PROTOCOL

(71) Applicant: Skytap, Seattle, WA (US)

(72) Inventors: Bradley M. Schick, Seattle, WA (US); Petr Novodvorskiy, Seattle, WA (US); Alan Pearson, Seattle, WA (US)

(73) Assignee: Skytap, Seattle, WA (US)

( * ) Notice: Subject to any disclaimer, the term of this patent is extended or adjusted under 35 U.S.C. 154(b) by 472 days.

This patent is subject to a terminal disclaimer.

(21) Appl. No.: 14/839,818

(22) Filed: Aug. 28, 2015

(65) Prior Publication Data
US 2015/0373151 A1    Dec. 24, 2015

Related U.S. Application Data

(63) Continuation of application No. 13/842,499, filed on Mar. 15, 2013, now Pat. No. 9,383,891.

(60) Provisional application No. 61/617,007, filed on Mar. 28, 2012.

(51) Int. Cl.
| | | |
|---|---|---|
| *G06F 3/0481* | (2013.01) | |
| *G06F 5/00* | (2006.01) | |
| *H04L 12/24* | (2006.01) | |
| *H04L 29/06* | (2006.01) | |
| *H04L 29/08* | (2006.01) | |

(52) U.S. Cl.
CPC .............. *G06F 3/0481* (2013.01); *G06F 5/00* (2013.01); *H04L 41/0226* (2013.01); *H04L 65/601* (2013.01); *H04L 67/08* (2013.01); *H04L 67/10* (2013.01); *H04L 67/42* (2013.01)

(58) Field of Classification Search
CPC ...................................................... G06F 3/0481
USPC ......................................................... 715/733
See application file for complete search history.

(56) References Cited

U.S. PATENT DOCUMENTS

| | | | | |
|---|---|---|---|---|
| 6,105,096 | A * | 8/2000 | Martinelli .......... | H04B 10/2503 709/250 |
| 7,937,438 | B1 * | 5/2011 | Miller .................... | H04L 41/12 370/397 |
| 7,940,740 | B2 * | 5/2011 | Krishnamurthy ..... | H04L 5/0007 370/235 |
| 8,473,325 | B2 * | 6/2013 | Barnhill, Jr. ........ | H04L 12/2809 705/7.29 |
| 8,627,195 | B1 * | 1/2014 | Hayden ............. | G06F 17/30873 715/229 |
| 8,856,075 | B2 * | 10/2014 | Rathod ............. | G06F 17/30867 705/14.49 |
| 2002/0124108 | A1 * | 9/2002 | Terrell .................. | H04L 63/083 709/245 |
| 2005/0256923 | A1 * | 11/2005 | Adachi ................ | G06F 9/4445 709/203 |
| 2005/0283731 | A1 * | 12/2005 | Saint-Hilaire ...... | H04L 12/2803 715/733 |

(Continued)

*Primary Examiner* — Reza Nabi
(74) *Attorney, Agent, or Firm* — Perkins Coie LLP

(57) ABSTRACT

Generating a universal graphical desktop sharing protocol is disclosed. The universal graphical desktop sharing protocol is configured to communicate information (e.g., a sequence of one or more desktop sharing events) that has been translated from a first graphical desktop sharing protocol and is available to be translated into a final graphical desktop sharing protocol.

22 Claims, 5 Drawing Sheets

(56) References Cited

U.S. PATENT DOCUMENTS

| | | | |
|---|---|---|---|
| 2007/0282951 A1* | 12/2007 | Selimis | H04L 67/06 709/205 |
| 2009/0013084 A1* | 1/2009 | Canu | H04L 67/08 709/229 |
| 2009/0288105 A1* | 11/2009 | Wookey | G06F 9/54 719/328 |
| 2011/0131573 A1* | 6/2011 | Antony | G06F 3/023 718/1 |
| 2012/0089666 A1* | 4/2012 | Goswami | G06Q 10/103 709/203 |
| 2012/0151373 A1* | 6/2012 | Kominac | G06F 17/30905 715/740 |
| 2012/0210235 A1* | 8/2012 | Sero | G06F 8/61 715/733 |
| 2013/0212161 A1* | 8/2013 | Ben-Shaul | G06F 9/4451 709/203 |
| 2013/0262690 A1* | 10/2013 | Matsuda | H04L 69/16 709/230 |
| 2013/0282792 A1* | 10/2013 | Graham | G06F 9/4445 709/203 |
| 2013/0283171 A1* | 10/2013 | Schick | G06F 3/0481 715/733 |
| 2014/0040360 A1* | 2/2014 | Privat | G06F 3/1423 709/204 |
| 2014/0254603 A1* | 9/2014 | Banavalikar | H04L 69/03 370/401 |
| 2014/0280997 A1* | 9/2014 | Dutta | H04L 69/03 709/230 |
| 2014/0359614 A1* | 12/2014 | Spracklen | G06F 9/45558 718/1 |
| 2015/0012654 A1* | 1/2015 | Derrin | H04L 12/6418 709/225 |
| 2015/0012918 A1* | 1/2015 | Derrin | G06F 9/45558 718/1 |
| 2015/0012973 A1* | 1/2015 | Derrin | G06F 9/45533 726/4 |

* cited by examiner

METHODS AND SYSTEMS FOR AN INTERMEDIATE GRAPHICAL DESKTOP SHARING PROTOCOL

This application is a continuation of U.S. patent application Ser. No. 13/842,499, filed on Mar. 15, 2013 and entitled "METHODS AND SYSTEMS FOR AN INTERMEDIATE GRAPHICAL DESKTOP SHARING PROTOCOL," which claims the benefit of and priority to U.S. Provisional Patent Application No. 61/617,007, filed on Mar. 28, 2012 and entitled "METHODS AND SYSTEMS FOR AN INTERMEDIATE GRAPHICAL DESKTOP SHARING PROTOCOL," all of which are incorporated by reference herein in their entireties.

BACKGROUND

A data center is a facility used to house computer systems and associated components, such as servers, storage systems, and virtual computing resources. Communications in data centers are commonly based on networks running the IP protocol suite. Data centers typically contain a set of routers and switches that transport traffic between the servers and to the Internet. Some of the servers at the data center are used for running the basic Internet and intranet services needed by internal users in the organization, e.g., e-mail servers, proxy servers, and DNS servers. Some data centers utilize virtualization in a hosting environment scenario to provide increased services to customers.

In software (i.e., a virtual machine ("VM")) virtualization simulates the hardware resources of a physical server. Multiple VMs, each with their own native operating system ("OS"), can securely run on a single physical server. Hosting VMs in a data center helps bridge the gap between shared web hosting services and dedicated hosting services by allowing it to have more independence from other customer's VM implementations and costing less than it does to operate dedicated physical servers.

A virtualization environment may be embodied in a physical host system, such as server. However, a separate server or multiple servers can also implement the virtualization environment. A guest VM operates logically on top of a hypervisor within a physical host system. The hypervisor is a software layer that typically provides virtualization, e.g., versions of computing resources such as of physical processors, memory and peripheral devices. In certain embodiments, the hypervisor may operate logically on top of a host operating system; in others, it may operate directly (logically) on top of the host hardware ("bare-metal hypervisors").

Various communication protocols are used to connect a customer's computer (the "client") to a VM. In some embodiments, the communication protocols provide the client with a graphical interface of the VM. For example, Virtual Network Computing ("VNC") is a graphical desktop sharing system that uses the Remote Frame Buffer ("RFB") protocol to remotely control another computer, such as a VM. The protocol transmits keyboard and mouse events from one computer to another, relaying the graphical screen updates back in the other direction, over a network. VNC is platform-independent; however, there are clients and servers for many GUI-based operating systems and for Java.

To enhance the fidelity of the graphical screen updates received from the graphical interface, increase efficiency, provide more robust security, and or implement additional features on top of the VNC concept, enhanced, sometimes platform-specific communications protocols were created. One such communication protocol is Remote Desktop Protocol (RDP), which is an extension of the ITU-T T.128 application sharing protocol. RDP uses customized video codecs that enable video compression/decompression for the graphical screen updates. Client-side RDP applications exist for connecting, to a VM, most versions of Microsoft Windows (including Windows Mobile), Linux, Unix, Mac OS X, Android, and other modern operating systems. The operating system loads RDP into memory and once activated it is available for client access (e.g., by a RDP software client) after the VM "boots."

Booting is the process that is initialized when a personal computer ("PC") is first powered on. Basic Input/Output System (BIOS) software is built into a physical or virtualized computer, and is the first code run by a PC and/or VM. When the PC and/or VM starts up, the first job for the BIOS is the power-on self-test, which initializes and identifies system devices such as the CPU, RAM, video display card, keyboard and mouse, hard disk drive, optical disc drive and other hardware. The BIOS then locates boot loader software held on a peripheral device (designated as a 'boot device'), such as a hard disk or a CD/DVD, and loads and executes that software (i.e., the operating system), giving it control of the PC. Once booted, by default the RDP server listens on TCP port 3389.

BRIEF DESCRIPTION OF THE DRAWINGS

One or more embodiments of the present invention are illustrated by way of example and not limited in the figures of the accompanying drawings, in which like references indicate similar elements.

DETAILED DESCRIPTION

Figure 1:
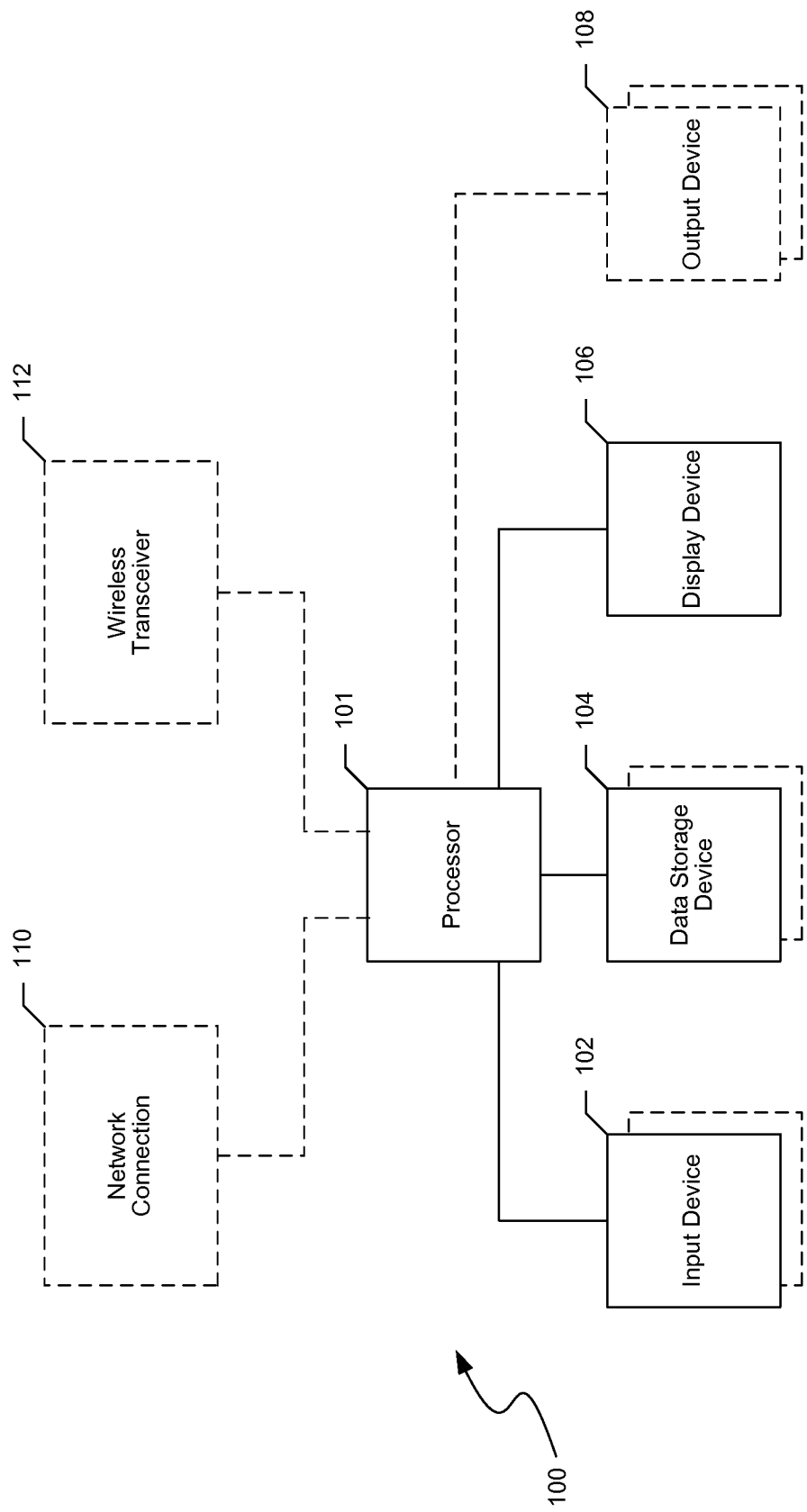
FIG. 1 is a block diagram of a basic and suitable computer that may employ aspects of the described technology.

The inventors have recognized that one problem with existing technology, such as with the use of "enhanced" communication protocols (e.g., those that provide higher fidelity), is that the enhancement requires resources (e.g., drivers) to be available from the VM's operating system (the "guest" operating system); however, these resources are only available after the guest operating system (OS) has booted. For example, a client cannot connect to the VM until the guest OS (e.g., Microsoft Windows running on the VM) has booted, is online and accessible by its network address (e.g., an IP address or hostname), and the VM server (e.g., RDP server) loaded. BIOS-only accessible resources, such as master/slave device settings, boot-modes, and some security settings are, therefore, inaccessible to data center customers. The inventors have recognized that another problem with existing technology is that once an existing session is terminated, for example by an intentional or unintentional network disconnection, a new session does not continue from the previous session. This can hamper efficiency by requiring a user to reproduce, in the new session, steps lost in the previous session. Another problem that the inventors have recognized with existing technology is that a guest OS's underlying security vulnerabilities may be exposed to the public (e.g., the Internet) and authentication mechanisms can be limited to the OS's own authentication agents. Still another problem with existing technology is that only a single client can have active control (e.g., mouse control) of a VM using VNC. This limits collaborative efforts where more than one user or presenter needs access to the desktop. Yet another problem with existing technology that the inventors have recognized is that the resolution of VM's using VNC is not dynamically resizable during a VM session. Some existing implementations require the termination of an active VM, manual resetting of the resolution, and restarting of the VM with the new resolution settings.

Various embodiments of the technology will now be described. The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

In some embodiments, the described technology provides systems and methods for generating a graphical desktop sharing stream in a universal graphical desktop sharing protocol. The graphical desktop sharing stream in universal graphical desktop sharing protocol is configured to communicate information (e.g., a sequence of one or more desktop sharing events) translated from a first graphical desktop sharing protocol and is available for translation into a final graphical desktop sharing protocol.

In some embodiments, the described technology provides access to a native OS's communication protocols without using the native OS's networking. This allows customers to have access to the native OS's higher-level sharing protocols, even if the native OS's networking is disabled. The disclosed technology can switch between using one graphical desktop sharing protocol and another. For instance, a first graphical desktop sharing program relays boot code (e.g., BIOS) display data from a virtual machine. However, after a second graphical desktop sharing protocol with enhanced features (e.g., higher fidelity graphics, etc.) becomes available to the VM (e.g., after the VM has booted into an OS), the described technology can switch to the enhanced protocol.

In some embodiments a multiplexer translates information in a first graphical desktop sharing protocol into an intermediate graphical desktop sharing protocol based on a client table. The client table lists data about a client (e.g., an RDP client at a PC), such as the graphical desktop sharing protocol that the client uses to access the multiplexer. The multiplexer translates the information in the first graphical desktop sharing protocol into an intermediate graphical desktop sharing protocol. In some embodiments, the multiplexer references a VM table to determine which graphical desktop sharing protocol is available at the VM and translates the information in the intermediate graphical desktop sharing protocol to the graphical desktop sharing protocol that was indicated as available.

In some embodiments the described technology publishes a graphical representation (e.g., an icon or thumbnail) of a visual representation of a VM's display. The graphical representation is made available to a client for facilitating a user's selection of a VM. The user can view the graphical representation, which can be updated periodically, to indicate the current state of the VM. Selecting a VM (e.g., clicking on a thumbnail or an icon representing the VM, etc.) can initiate a connection (e.g., using RDP, SSL/RDP, non-RDP, etc.) for requesting information from the VM.

The described technology is configurable to allow multiple clients to simultaneously control a single VM. The clients' information represented in a proprietary graphical desktop sharing protocol is translated, by a multiplexer, into a universal, intermediate format that can be aggregated (i.e., combined or multiplexed with other client's) and translated for use in a final graphical desktop sharing protocol that is available at the VM. The multiplexed information in the final graphical desktop sharing protocol is sent, by the multiplexer, for delivery to the VM. Responses from the VM are sent for delivery to the multiplexer where the reverse translation occurs (e.g., from a final graphical desktop sharing protocol, to an intermediate protocol, to the clients' protocol(s)). Multiplexing client information in a graphical desktop sharing protocol allows each user at a client to simultaneously control the VM's mouse indicator, interact with programs, enter keyboard commands, etc.

FIG. 1 and the following discussion provide a brief, general description of a suitable computing environment in which aspects of the described technology can be implemented. Although not required, aspects of the technology may be described herein in the general context of computer-executable instructions, such as routines executed by a general or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet switched, circuit switched, or other scheme).

The described technology can also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or sub-routines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the technology are also encompassed within the scope of the described technology.

Referring to FIG. 1, the described technology employs a computer (100), such as a personal computer, workstation, phone or tablet, having one or more processors (101) coupled to one or more user input devices (102) and data storage devices (104). The computer (100) is also coupled to at least one output device such as a display device (106) and one or more optional additional output devices (108) (e.g., printer, plotter, speakers, tactile or olfactory output devices, etc.). The computer (100) may be coupled to external computers, such as via an optional network connection (110), a wireless transceiver (112), or both. For example, network hubs, switches, routers, or other hardware network components within the network connection (110) and/or wireless transceiver (112) can couple one or more computers (100).

The input devices (102) may include a keyboard and/or a pointing device such as a mouse. Other input devices are possible such as a microphone, joystick, pen, game pad, scanner, digital camera, video camera, and the like. The data storage devices (104) may include any type of computer-readable media that can store data accessible by the computer (100), such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Figure 2:
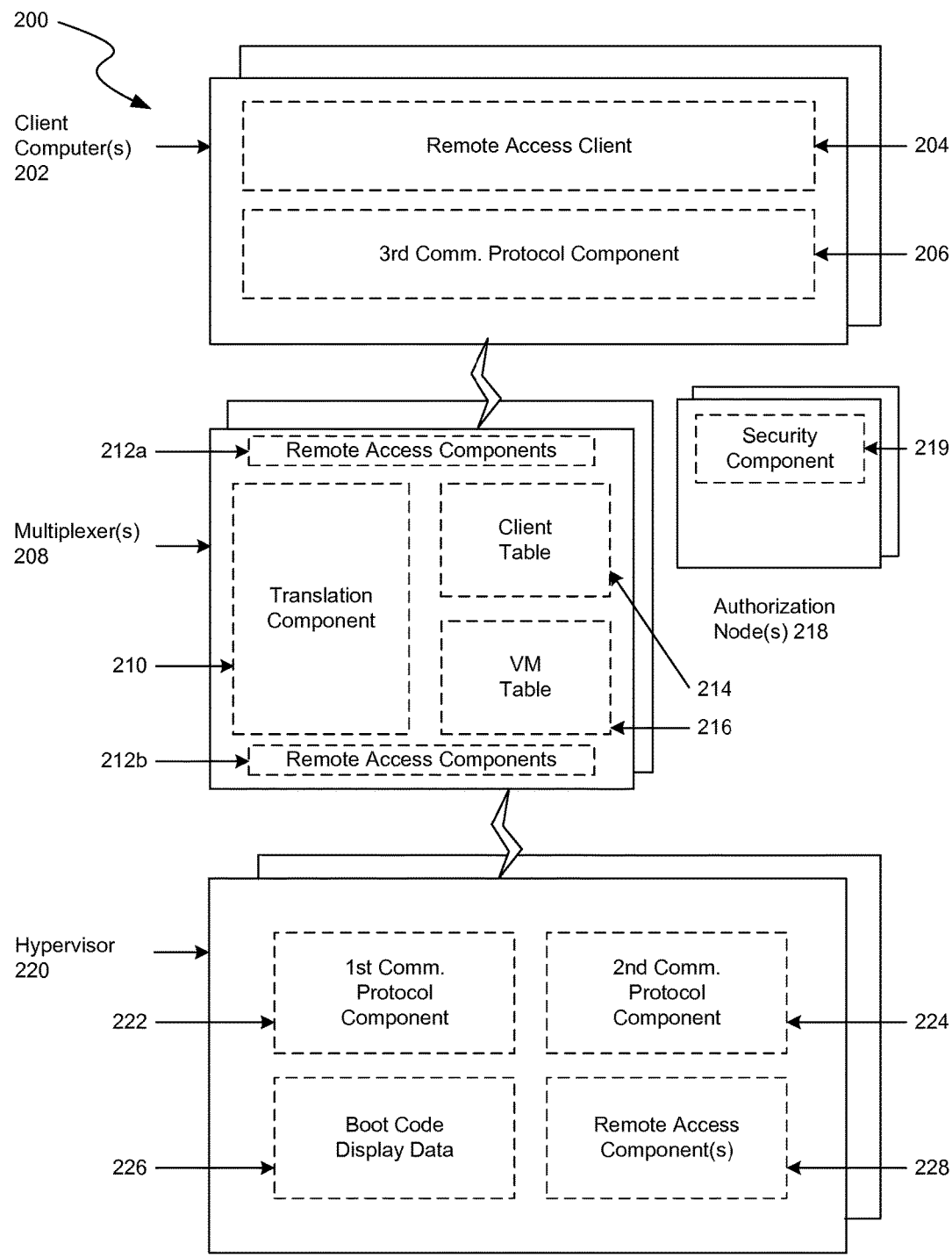
FIG. 2 is a block diagram illustrating a simple, yet suitable system in which aspects of the described technology operate in a universal graphical protocol system.

Aspects of the described technology may be practiced in a variety of other computing environments. For example, referring to FIG. 2, a universal graphical protocol system (200) is capable of implementing features of the described technology. FIG. 2 includes one or more clients (202), multiplexers (208), authentication nodes (218), and hypervisors (220).

Hypervisor(s)

One or more hypervisors (220) include a first communication protocol component (222) for communicating boot code display data (226), a second communication protocol component (224) for communicating with a proxy (depicted in FIG. 3), and remote access components (228) for sending and or receiving data via the second communication protocol component (224).

The first communication protocol component (222) is operational at least during the VM's "boot process" and can send VM's boot code display data (226) (e.g., BIOS information), via a multiplexer (208), for display at a client (202). Similarly, during the boot process the client (202) can send information to the VM via the multiplexer (208). In some embodiments, the first communication protocol component (222) is a graphical desktop sharing protocol that provides information from a VM to the multiplexer (208). For example, the first communication protocol component (222) can include aspects of a VNC graphical desktop sharing system that uses the Remote Frame Buffer ("RFB") protocol to communicate keyboard and mouse events and relay graphical screen updates (e.g., updates of boot code display data (226)) between the client (202) and VM (see FIG. 3). Other graphical desktop sharing protocols have been contemplated.

The second communication protocol component (224) generates a graphical desktop sharing protocol for sharing a VM's desktop. In some embodiments, the graphical desktop sharing protocol generated by the second communication protocol component (224) becomes available after at least part of the VM's native operating system (not shown) is loaded into memory. By relying on resources (e.g., display driver(s) of the native operating system), the second communication protocol component (224) may generate higher fidelity graphical desktop sharing protocols than those generated by the first communication protocol component (222).

In some embodiments, the second communication protocol component (224) generates an RDP stream. RDP is an extension of the ITU-T T.128 application sharing protocol, known in the art and incorporated by reference in its entirety herein. Native RDP ("RDP") uses customized video codecs that enable video compression/decompression for the graphical screen updates in order to achieve visual enhancements and improved efficiency over high latency networks. RDP is loaded into memory, by the operating system, and is then available for access and to send information.

The remote access components (228) facilitate the transfer of information (e.g., graphical screen updates, keyboard and mouse events, etc.) via one or more graphical desktop communication protocols. For example, a remote access component (228) can send information for delivery to multiplexer 208, via a traffic stream in RDP. In some embodiments and as further explained below, the remote access components (228) establish a virtual socket ("VSock") connection for communicating data in RDP to a proxy (312) VM executing under the control of the same hypervisor. The VSock connection and other features of the remote access components (228) are further depicted in FIG. 3.

Multiplexer

The multiplexer (208) includes remote access components (212a-b), translation component (210), VM table (216), and client table (214). Remote access components (212a-b) are similar to remote access components (228) in that they facilitate the transfer of information. As mentioned above, information may include one or more sequences of events, such as a screen update, mouse movement, keyboard press event, etc. Remote access components (212a-b) can facilitate the transfer of information transfer using one or more graphical desktop communication protocols, such as a remote frame buffering protocol (e.g., VNC), RDP, Citrix ICA, NX, AIP, X11, etc. In some embodiments, one remote access component (212b) facilitates the transfer of information in RDP or VNC from the hypervisor (220), and another remote access component (212a) facilitates the transfer of information in VNC or RDP to and or from the client (202).

Translation component (210) receives information from remote access components (212a-b) in order to generate the information into an intermediate graphical desktop sharing format. The intermediate graphical desktop sharing format is convertible between different graphical desktop sharing protocols. For example, translation component (210) can receive a stream of boot code display data (226) from hypervisor (220). In some embodiments, the translation component (210) converts a VM streaming having portions of the boot code display data (226) into an intermediate graphical desktop sharing format. The intermediate boot code display data (226) is available for translation into other graphical desktop sharing protocols (e.g., RDP) and vice versa. One advantage to translating information into an intermediate, universal format is that it is extensible to both known and future graphical desktop display protocols. As described below, another advantage to translating information into an intermediate, universal format is that it allows for a 1-to-n translation scenario where a single VM is accessible and simultaneously controllable by multiple clients (202) that use at least a different graphical desktop sharing protocol. Additionally, as further described below, translation component (210) can multiplex several client abilities to simultaneously control a VM.

Figure 5:
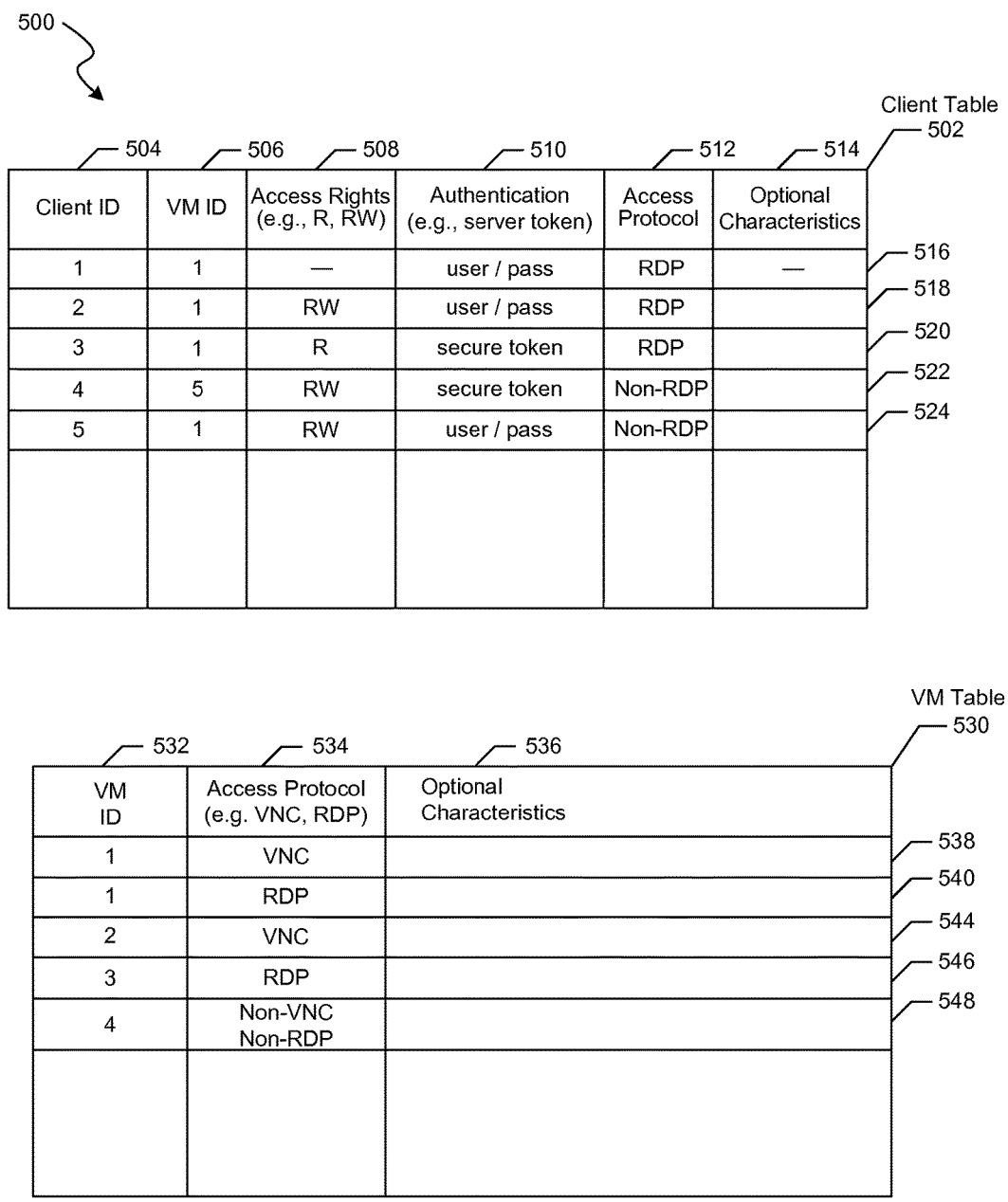
FIG. 5 is a simple, yet suitable representation of a client table and a VM table.

VM table (216) can be referenced to determine the availability of one or more VMs at a hypervisor (220). In some embodiments, the multiplexer (208) references VM table (216), which indicates the particular graphical desktop sharing protocol(s) (e.g., RDP or VNC) running at each VM in the VM table (216). Additional details regarding the VM table (216) are depicted in FIG. 5.

Client table (214) and authentication node(s) (218) (optional) can be referenced to determine whether a client (202) or user can access a VM. In some embodiments, client table (214) is analyzed by multiplexer (208) and or authentication node (218) to determine if clients (202) have entered the correct username and password. In another embodiment, client table (214) is referenced by multiplexer (208) to determine whether a client (202) has authorized graphical desktop sharing protocol (e.g., RDP) and authorized access rights (e.g., read, write, read/write, etc.) at a VM (6). The authentication node (218) includes a security component (219) that can deny a client (202) access to VM, based on one or more entries in the client table (214), firewall configurations, or other security characteristics. Additional details of the client table (214) are depicted in FIG. 5.

Client Computer

Client computer (202) (e.g., a PC, laptop, mobile device, smart phone, etc.) includes a remote access client (204) and a third communication protocol component (206). Client computer (202) can have similar features as computer 100 in FIG. 1.

Remote access client (204) can execute on an operating system (not shown) to connect, via the third communication protocol component (206), to multiplexer (208). Communication from client (202) to multiplexer (208) can be based on wired and/or wireless technologies and may include any of a number of network and low-level communication protocols, such as TCP/IP, Bluetooth, and LAN/WAN-based protocols. In some embodiments, the third communication protocol component (206) is RDP and remote access client (204) is a client-side RDP application for connecting to an RDP server, such as one or more RDP servers at remote access component (212a).

In some embodiments, to access a VM, a user at client (202) selects a visual representation (e.g., an icon) of the VM. The visual representation is a snapshot of the VM generated by the multiplexer (208) and placed at a location accessible to client (202). The icon can include or be part of a hyperlink or other mechanism such that when the user selects the icon, the client (202) initiates a request to multiplexer (208). Alternatively or additionally, the user can select a VM by other means, such as selecting a name associated with the VM, etc.

Once the user selects a VM (e.g., by selecting an icon or visual representation of the VM or indicating a selection by a different user input), client (202) initiates a connection via the third communication protocol component (206) to the multiplexer (208). The client's (202) rights are verified by referencing client table (214) and/or consulting authentication node (218). If the client's (202) rights are verified and the multiplexer (208) determines, via the VM table (216), that the VM is accessible, the client (202) can send and receive information via the multiplexer (208), to the VM. The information sent from client (202), via third communication protocol component (206) (e.g., RDP), is received by multiplexer (208) where the information is converted into an intermediate format, as described above. The information in the intermediate format is translated by the multiplexer (208) into a graphical desktop sharing protocol (e.g., RDP, VNC, etc.) that is used by the VM, as indicated in VM table (216). The multiplexer (208) sends, for delivery to the VM, the information in a graphical desktop sharing stream supported by the VM's graphical desktop sharing protocol.

Similarly and described more below, the reverse path of information from a VM to the client (202) can be translated by the multiplexer (208). For example, information in VNC, received from a VM, can be translated into an intermediate, universal format. The information in the intermediate universal format can then be translated into the graphical desktop sharing protocol used by the clients (202).

Figure 3:
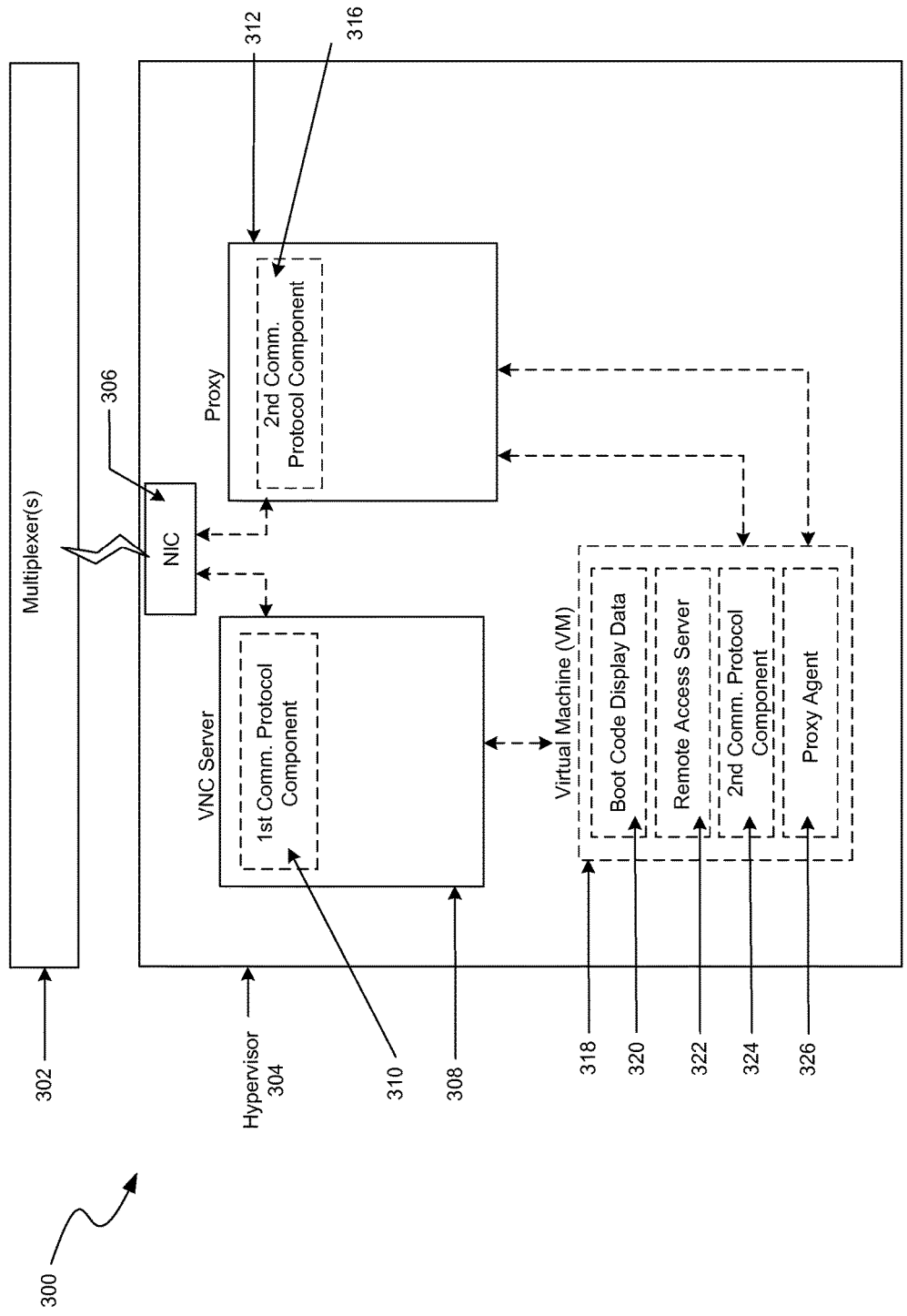
FIG. 3 is a block diagram illustrating a simple, yet suitable system in which aspects of the described technology may operate in a hypervisor.

FIG. 3 is a depiction (300) of a hypervisor (304) capable of implementing features of the described technology. Hypervisor (304) presents to VM (318) a virtual operating platform and manages the execution of VM (318). Hypervisor (304) includes a VNC server (308), proxy (312) and network interface card ("NIC") (306).

NIC

NIC (306) is a network interface that passes traffic from hypervisor (304) (i.e., via VNC server (308) and proxy (312)), to multiplexer (302). NIC (306) can communicate using standing technology, such as TCP/IP, and is extensible for communicating using future technology.

Virtual Machine and VNC Server

VM (318) includes boot code display data (320), second communication protocol component (324), and proxy agent (326). VNC server (308) includes first communication protocol component (310). In some embodiments, VNC server (308) supervises VM (318). For example, VNC server (308) instantiates VM (318) and maintains communications between VM (318) and a VM client (e.g., remote access component (212b) at multiplexer (208).

Once instantiated by hypervisor (304), the multiplexer 302 can access VM (318) via the first communication protocol component (310) (e.g., VNC). After instantiation, the VM (318) can boot its operating system. During the boot process, boot code display data (320) is available for display in a graphical desktop sharing stream that is generated by first communication protocol (310). For example, components of the multiplexer (302) can act as VNC clients to establish communication, via first communication protocol component (310), to VNC server (308).

In some embodiments, the hypervisor (304) "attaches" VNC server (308) to VM (318) to relay frame buffer data over the network. The multiplexor (302) connects to the hypervisor's (304) VNC server (308) to send and or receive data. In some embodiments, the multiplexor (302) requests a full frame buffer update (i.e., a snapshot) of the VNC server (308). As mentioned above, the snapshots (e.g., icons) are used to facilitate a user's selection of a VM (318). The multiplexer (302) can reference and or record entries into the VM table (216), which stores data regarding VM's (318) availability and the graphical desktop sharing protocol (e.g., VNC) currently available at VM (318).

In the above scenario, both the multiplexer (302) and the VNC server (308) communicate using VNC; however, other remote frame buffer protocols and graphical desktop sharing protocols can be substituted.

During the boot process, the operating system loads resources (e.g., display drivers) into system memory (i.e., RAM). Second communication protocol component (324) and a remote access server (322) leverage resources on the operating system to provide enhanced graphical desktop sharing features, such as higher graphical fidelity, reduced data size, and/or other improvements. Unlike the VNC server (308), remote access server (322) is typically not available upon the instantiation of a VM (318); therefore a connection using the enhanced graphical desktop sharing protocol must wait until remote access server (322) is available.

Until remote access server (322) is available, VM (318) communicates via the first communication protocol component (310) (e.g., VNC). After VM's (318) remote access server (322) is available, VM (318) can communicate via the second communication protocol component (324) (e.g., RDP).

In some embodiments, a proxy agent (326) provides a client the ability to access a VM desktop over a higher fidelity protocol without requiring the VM host's operating system's networking. Proxy agent (326) monitors VM (318) to determine (i.e., "listen") when the remote access server (322) is accessible. One method of determining that remote access server (322) is accessible for receiving an RDP session, for example, is to monitor the TCP ports commonly used by remote access server (322). For example, RDP is known to communicate using TCP port 3389. Proxy agent (326) can send ICMP packets (i.e., "pings") to TCP port 3389. If proxy agent (326) receives a positive indication or response, it can be resolved that remote access server (322) is available to send and receive information in RDP. In some embodiments, proxy agent (326) establishes a communication channel other than networking provided by VM (318) (e.g., VSock connection) to proxy (312) in order to send a registration to multiplexer (302). The registration can be entered into VM table (216) to indicate that VM (318) is available to communicate information (e.g., graphical screen updates, keyboard and mouse events, etc.) via the second communication protocol component (324) (e.g., RDP).

Proxy (312) includes the second communication protocol component (316). In some embodiments, proxy (312) is a VM that relays a graphical desktop sharing protocol (e.g., RDP) to and from remote access server (322). For example, proxy agent (326) can send data (e.g., registration message) to proxy (312) that remote access server (322) is available to receive RDP sessions. Proxy (312) can receive, via a Vsock connection, the data in a second protocol communication stream and relay the stream of data to multiplexer (302). As mentioned below for FIG. 5, multiplexer (302) can record in the VM table (216) an entry that VM (318) is available via RDP, for example. After registering VM (318), proxy (312) passes streams of information in a graphical desktop sharing protocol between multiplexer (302) and VM (318).

Figure 4:
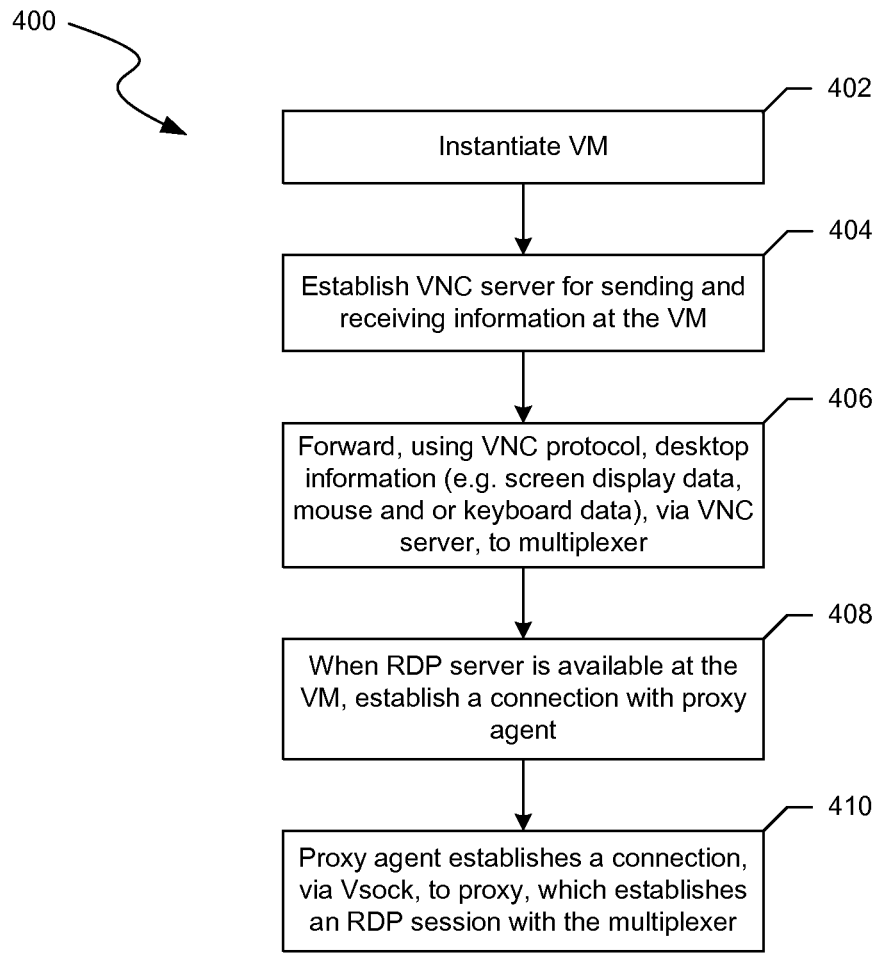
FIG. 4 is a flow diagram depicting a simple, yet suitable method in which aspects of the described technology may operate when switching from a VNC graphical desktop sharing protocol to a RDP graphical desktop sharing protocol, during a virtual machine's boot process.

FIG. 4 is a flow diagram (400) depicting a boot process of a VM, such as VM (318). In step 402, VM (310) is instantiated. Instantiation is performed by hypervisor (304). Once instantiated, hypervisor (304) establishes, at step 404, a VNC server (308) for communicating streams of information to and from VM (318). The VNC server (308) listens for requests from VNC clients at remote access component (212b). In some embodiments, multiplexer (302) sends to VM (318), via a VNC client at remote access component (212b), a request for information (e.g., screen display data of the VM (318), such as boot code display data (320)). In response, VM (318) sends the requested information via hypervisor (304) VNC server (308) to multiplexer (302), in step 406.

In some embodiments, multiplexer 302 chooses between different graphical desktop sharing protocols available to the VM (318) and or hypervisor (308). In some embodiments, remote access server (322) and the second communication protocol component (324) may have enhanced features beyond those of the first communication protocol component (310), as mentioned above. Multiplexer (302) can automatically, or based on a user selection, choose VM (318) from sending information in the inferior graphical desktop sharing protocol (e.g., VNC) to sending information in the superior graphical desktop sharing protocol (e.g., RDP). For example, when VM (318) is instantiated, BIOS information is sent via first communication protocol component (310) (e.g., VNC), which may be an inferior graphical desktop sharing protocol.

To use a second, enhanced communication protocol (e.g., RDP), VM (318) may need to load various resources (e.g., display drivers, etc.) used by the remote access server (322). Proxy agent (326) determines, at step 408, when remote access server (322) (e.g., RDP server) is online ("available"). As described above, proxy agent (326) can "ping" remote access server (322) until a response is received indicating that remote access server (322) is available.

At step 410, once remote access server (322) is available, proxy agent (326) can establish a connection with remote access server (322) to facilitate communication between VM (318) and proxy (312). Proxy agent (326) can send, for delivery to multiplexer (302), a registration of VM's (318) availability by establishing a VSock connection to proxy (312). Proxy (312) receives the registration and forwards it to multiplexer (302) where the registration can be entered into the VM table (216), as further described below. In response to VM's (318) availability to communicate with remote access server (322), as indicated in VM table (216), multiplexer (304) can send and receive information in the enhanced communication protocol (e.g., RDP) through proxy (312) to VM's (318) remote access server (322).

Multiple Sessions

Described below is an example of one implementation of the described technology's ability to enable two or more clients (202) to simultaneously control the virtual display of VM (318). Multiplexer (208) facilitates multiple clients' interactions (e.g., graphical desktop sharing sessions ("sessions")) with one or more VMs (318). In some embodiments, multiplexer (208) receives, for each client (202) a separate stream of information in a graphical desktop communication protocol (e.g., RDP). Assuming that clients (202) are authorized (explained further below), translation component (210) translates each client's session (e.g., information streams sent in RDP) into a universal intermediate format, as explained above. Each client's information in the universal intermediate format is aggregated, by the translation component (210) into a graphical desktop sharing display protocol stream, based on the protocol indicated for the VM (318) in VM table (216). Multiplexer (208) relays the aggregated information in the VM's graphical desktop sharing protocol, via remote access component (212(b)), to proxy (312) where it is forwarded to the VM (318).

Proxy agent (326) relays the aggregated information to remote access server (322) to enable each of clients (202) to simultaneously control the features at VM (318), such as moving the mouse, entering keyboard commands, and interacting with software (e.g., presentations, spreadsheet, and word processing documents). Each client (202) is limited in their ability to control the VM (318) based on the client's (202) access rights (e.g., as determined by referencing the client table (214)).

Additional client sessions can be multiplexed by translation component (210) to facilitate more client (202) control at VM (318). A client (202) can be dropped by the translation component (210) from a multiplexed session at VM (318). In this case, the translation component (210) decouples the leaving client's information from the multiplexed session while still maintaining the session for the remaining clients (202).

FIG. 5 depicts tables 500 that feature a client table (502) and a VM table (530). Tables 500 are accessible to the multiplexer (302) for determining aspects of the described technology.

Client table (502) is an example data structure capable of implementing one or more features of the described technology. Client table (502) is depicted as a single table, however, multiple tables, alone or working in conjunction, can store portions of the features in client table 500 (e.g., the information in columns (504-514) and rows (516-524, etc.)). Client table (502) is used to, among other things, authenticate a client's access rights (i.e., authentication is not required, limited to or even necessarily performed by the VM (318)). Client table (502) includes columns (504-514) and rows (516-524) for clients (202) receiving or requesting information from VM (318). Column 504 indicates client IDs for each respective client (202) requesting information from VM (318). Column 506 indicates VM IDs for each VM that a client (202) is requesting access. For example, "client ID" "1," "client ID" "2," "client ID" "3," and "client ID" "5" are requesting access to "VM ID" "1," (e.g., VM (318)) and "client ID" "4" is attempting to access "VM ID" "5."

Column (508) indicates what access rights a "client ID" may have, if any, during a session with VM (318). Rights may include the ability to read ("R"), write ("W"), or a combination thereof. For example, "client ID" "1" has no access rights and will not be allowed to receive VM's (318) information, "client ID" "3" has read-only access to "VM ID" "1," "client ID" "4" has read and write access to "VM ID" "5", and "client ID" "2" and "client ID" "5" each have read and write access to "VM ID" "1."

Column (510) indicates the authentication type that a client (202) uses to establish a session with multiplexer (302). For example, a client (202) can, or may be forced to, utilize a username and password combination for authentication, as is known in the art. Additionally or alternatively, a secure token or other security mechanism (e.g., biometrics, etc.) can be used to control client's (202) access.

Column (512) indicates the graphical desktop sharing protocol (e.g., RDP, non-RDP, VNC, etc.) that a client (202) is using, or must use, to establish a session with multiplexer (32). Column (514) indicates one or more additional characteristics that are optionally available for determining how a client (202) is screened.

In some embodiments, portions of client table (500) may or may not remain persistent in client table (500) or other data structure. For example, a client (504) access right (508) may be pushed from client table (500) after the client (504) connects to VM (318).

VM table (530) includes columns (532-536) and one or more rows (538-548). Column (532) indicates a "VM ID" for each available VM (318). For example, column (532) indicates that a VM associated with "VM ID" "1" is available, and VMs corresponding to "VM IDs" "2," "3," and "4," respectively, are available.

Column (534) indicates, for each "VM ID," the type of graphical desktop display protocol (e.g., VNC, RDP, etc.) that is currently available at each VM "1-4". Column (536) indicates one or more additional characteristics that are optionally available for determining further aspects of the VMs. In various embodiments, the type of graphical desktop protocol is selected by the described technology based on a priority or preference for a given graphical desktop protocol. For example, if multiple types of graphical desktop protocols are available at a VM, the most efficient of a given set of graphical desktop protocols may be given a top priority. Priorities may be represented in, for example, a data structure, such as a new column (not shown) in VM table (530) or a separate data structure. For example, RDP may have a priority of "0" and VNC (e.g., because it may be less efficient than RDP) may have a priority of "1.")

Examples will now be provided for various scenarios of interaction between clients (202), multiplexer (302), and VMs (318), based on client table (502) and VM table (530).

Row (548) indicates that a VM associated with "VM ID" "4" is accessible by a non-VNC, non-RDP-based graphical desktop sharing protocol (e.g., Citrix).

Row (516) of client table (502) indicates that a client (202) having "client ID" "1" is attempting to access, via RDP, a VM (318) having "VM ID" "1." Access has been denied because the client had no access rights (indicated by the minus sign). Optionally, the entry for "client ID" "1" is not entered into the client table (516). This may be preferable, for instance, when a separate component supervises the security screening, such as a firewall, an AAA server, etc.

Row (518) of client table (502) indicates that a client (202) having "client ID" "2" is attempting to access, via RDP, a VM (318) having "VM ID" "1." Read and write access is granted, if the correct username and password are entered. The multiplexer (302) references VM table (530) to determine if the VM (318) associated with "VM ID" "1" is available and, if so, which graphical desktop protocol is available at VM (318). In this example, VM table (530) indicates, at VM row (538), that VNC is available at "VM ID" "1". The use of VNC may indicate that the VM (318) associated with "VM ID" "1" is booting, as described above. Multiplexer (302) can generate an intermediate graphical desktop sharing format from the graphical desktop sharing formats used by clients (202) and VM (318). In this example, the multiplexer (302) can translate from RDP (as indicated for "client ID" "2" in client table (502)) to an intermediate format that is translated to VNC (as indicated in row (538) of VM table (530)). Information (e.g., desktop sharing streams, mouse movements, etc.) can then be communicated from VM (318) to multiplexor (302) to client (202), and vice versa.

In the next scenario, multiple clients (202) attempt to simultaneously access, via multiplexer (302), VM (318) after it has booted. Row (520) of client table (502) indicates that a client (202) having "client ID" "3" is attempting to access, via RDP, "VM ID" "1." Read-only access is granted by the multiplexer (302) if the correct secure token information is entered. Row (524) of client table (502) indicates that a client (202) having "client ID" "5" is also attempting to access "VM ID" "1," via a non-RDP graphical desktop sharing protocol. Read and write access is granted by the multiplexer (302) if the correct username and password are entered. Multiplexer (302) translates the RDP stream of "client ID" "3" and the non-RDP stream "client ID" "5" into an intermediate graphical desktop sharing format that can be translated into any of a variety of other graphical desktop sharing formats.

In the above scenario, the intermediate graphical desktop sharing formats are translated into RDP because row (540) indicates that "VM ID" "1" is now using RDP, which indicates that VM (318) associated with "VM ID" "1" has booted into its operating system and is accessible via RDP. As described above, proxy (312) facilitates each client's (202) ability to simultaneously control VM (318). For example, a user associated with "client ID" "3" can see a visual depiction of VM's (318) screen and simultaneously operate the VM's (318) mouse and/or software at substantially the same time as a user associated with "client ID" "5."

Other scenarios have been contemplated by the inventors. For example, row (522) indicates that "client ID" "4" is attempting to request information at "VM ID" "5"; however, "VM ID" "5" is not listed in VM table (530), so multiplexer (302) or another component will deny access. Optionally, multiplexor (302) can inform the client (202) that is associated with "client ID" "5" when the VM (318) associated with "VM ID" "5" becomes available. For example, multiplexer (302) can periodically check VM table (530) for "VM ID" "5" and automatically inform and/or connect the client (202) to the VM (318) associated with "VM ID" "5".

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

These and other changes can be made to the described technology in light of the above Detailed Description. While the above description details certain embodiments of the technology and describes the best mode contemplated, no matter how detailed the above appears in text, the described technology can be practiced in many ways. The described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

What is claimed is:

1. At least one computer-readable medium not exclusively consisting of a transitory signal per se having contents that, when executed by at least one data processing device, performs graphical desktop sharing technology, comprising:
   determining that a first graphical desktop protocol is available at a computing resource at a time when the computing resource has not loaded a guest operating system, wherein a second graphical desktop protocol is available at the computing resource when the guest operating system has at least partially loaded;
   in response to receiving, from a client, a data stream in a third graphical desktop protocol for communicating with the computing resource at the time when the computing resource has not loaded the guest operating system, converting at least a first portion of the data stream from using the third graphical desktop protocol into a configuration that is compliant with the first graphical desktop protocol; and
   in response to determining that the second graphical desktop protocol is available at the computing resource, converting at least a second portion of the data stream from using the third graphical desktop protocol into a configuration that is compliant with the second graphical desktop protocol.

2. The computer-readable storage device of claim 1, wherein the configuration that is compliant with the first desktop sharing protocol and the configuration that is compliant with the second desktop sharing protocol are the same configuration.

3. The computer-readable storage device of claim 2, wherein the configuration is a universal desktop sharing protocol, wherein the universal desktop sharing protocol can translate between a plurality of types of desktop sharing protocols and wherein the computing resource is a VM.

4. The computer-readable storage device of claim 3, wherein a first of the plurality of types of desktop sharing protocols is based on a remote frame buffer protocol and a second of the plurality of types of desktop sharing protocols is based on an ITU-T T.128 protocol.

5. The computer-readable storage device of claim 1, wherein the conversion is based on an extensible protocol conversion.

6. The computer-readable storage device of claim 3, further comprising generating a visual representation of video associated with the computing resource.

7. The computer-readable storage device of claim 3, further comprising modifying a record to indicate whether the computing resource is available for communication in the first graphical desktop protocol or the second graphical desktop protocol.

8. The computer-readable storage device of claim 3, further comprising verifying whether an entry in a record indicates that the client is authorized to communicate with the computing resource.

9. The computer-readable storage device of claim 3, further comprising verifying whether an entry in a record indicates that the client is authorized to communicate using the third graphical desktop protocol, wherein the computing.

10. A computer-implemented method, comprising:
    determining that a first computing resource is accessible via a first desktop sharing protocol at a first time, wherein the first computing resource is accessible via a second desktop sharing protocol at a second time;

in response to receiving, prior to the second time, data from a second computing resource to communicate with the first computing resource, converting the data from a third desktop sharing protocol into a format that is compliant with the first desktop sharing protocol; and in response to receiving, after the second time, data from the second computing resource to communicate with the first computing resource, converting the data in the third desktop sharing protocol into a format that is compliant with the second desktop sharing protocol, wherein the first desktop sharing protocol is available when a computing resource has not loaded a guest operating system, and the second desktop sharing protocol is available when the guest operating system has at least partially loaded.

11. The computer-implemented method of claim 10, wherein the format that is compliant with the first desktop sharing protocol is also compliant with the second desktop sharing protocol.

12. The computer-implemented method of claim 10, further comprising generating a visual representation of video output of the first computing resource.

13. The computer-implemented method of claim 10, wherein at least one of the desktop sharing protocols is based on VNC or RDP.

14. The computer-implemented method of claim 10, further comprising determining whether the first computing resource is available for communicating using the first desktop sharing protocol or using the second desktop sharing protocol.

15. One or more hardware computer systems each including at least one processor, comprising:
 a communication subsystem configured to receive a computing resource indication that a first desktop sharing protocol is available for communicating with the computer resource: and
 a conversion subsystem configured to in response to receiving, from a client for delivery to the computing resource, a data stream in a third desktop sharing protocol, convert portions of the data stream from using the third desktop sharing protocol into a format that is compliant with the first desktop sharing protocol,
 the communication subsystem being further configured to, in response to determining that a second desktop sharing protocol is available at the computing resource, send portions of the data stream in a format that is compliant with the second desktop sharing protocol,
 wherein the first desktop sharing protocol is available at a time when a computing resource has not loaded a guest operating system, and the second desktop sharing protocol is available at a time when the guest operating system has at least partially loaded.

16. The one or more hardware computer systems of claim 15, further configured to determine whether the computing resource is available for communicating using the first desktop sharing protocol or using the second graphical desktop sharing protocol.

17. The one or more hardware computer systems of claim 15, wherein the format that is compliant with the first desktop sharing protocol and the format that is compliant with the second desktop sharing protocol are the same format.

18. The one or more hardware computer systems of claim 15, wherein the indication includes registration information.

19. A computing system for providing a universal graphical desktop sharing protocol for use in a hosted virtual computing environment, comprising:
 at least one processor; and
 one or more components responsive to instructions executed by the at least one processor wherein the one or more components are configured to:
 in response to receiving a first indication that a first computing resource is available to receive data in a first graphical desktop sharing format, sending a first portion of a data stream to the first computing resource, wherein the first portion of the data stream was converted from a universal graphical desktop sharing format into the first desktop sharing format; and
 in response to receiving a second indication that the first computing resource is available to receive data in a second graphical desktop sharing format, sending a second portion of the data stream to the first computing resource, wherein the second portion of the data stream was converted from the universal graphical desktop sharing format into the second graphical desktop sharing format,
 wherein the first graphical desktop sharing format is available at a time when a computing resource has not loaded a guest operating system, and the second graphical desktop sharing format is available at a time when the guest operating system has at least partially loaded.

20. The computing system of claim 19, wherein the first graphical desktop sharing format is available at the first computing resource before a guest operating system is operational.

21. The computing system of claim 19, wherein the second graphical desktop sharing format is not available at the first computing resource before a guest operating system is at least partially loaded.

22. The computing system of claim 19, wherein the first indication is received by a virtual network interface card.

* * * * *

UNITED STATES PATENT AND TRADEMARK OFFICE
CERTIFICATE OF CORRECTION

PATENT NO. : 9,939,984 B2
APPLICATION NO. : 14/839818
DATED : April 10, 2018
INVENTOR(S) : Schick et al.

Page 1 of 1

It is certified that error appears in the above-identified patent and that said Letters Patent is hereby corrected as shown below:

In the Specification

In Column 1, Line 65, delete "and or" and insert -- and/or --, therefor.

In Column 5, Line 54, delete "and or" and insert -- and/or --, therefor.

In Column 6, Line 56, delete "and or" and insert -- and/or --, therefor.

In Column 7, Line 24, delete "and or" and insert -- and/or --, therefor.

In Column 8, Line 59, delete "and or" and insert -- and/or --, therefor.

In Column 8, Line 64, delete "and or" and insert -- and/or --, therefor.

In Column 10, Line 8, delete "and or" and insert -- and/or --, therefor.

In the Claims

In Column 15, Line 36, in Claim 15, delete "resource:" and insert -- resource; --, therefor.

Signed and Sealed this
Thirty-first Day of July, 2018

Andrei Iancu
*Director of the United States Patent and Trademark Office*